United States Patent
Davis et al.

(10) Patent No.: US 10,003,789 B2
(45) Date of Patent: Jun. 19, 2018

(54) PRACTICAL TWO-FRAME 3D+2D TV

(71) Applicant: The Regents of the University of California, Oakland, CA (US)

(72) Inventors: James E. Davis, Los Gatos, CA (US); Jing Liu, Hayward, CA (US)

(73) Assignee: The Regents of the University of California, Oakland, CA (US)

(*) Notice: Subject to any disclaimer, the term of this patent is extended or adjusted under 35 U.S.C. 154(b) by 196 days.

(21) Appl. No.: 14/901,020

(22) PCT Filed: Jun. 24, 2014

(86) PCT No.: PCT/US2014/043911
§ 371 (c)(1),
(2) Date: Dec. 22, 2015

(87) PCT Pub. No.: WO2014/210033
PCT Pub. Date: Dec. 31, 2014

(65) Prior Publication Data
US 2016/0381353 A1    Dec. 29, 2016

Related U.S. Application Data

(60) Provisional application No. 61/838,519, filed on Jun. 24, 2013.

(51) Int. Cl.
*H04N 13/00* (2018.01)
*H04N 13/04* (2006.01)

(52) U.S. Cl.
CPC ..... *H04N 13/0456* (2013.01); *H04N 13/0048* (2013.01); *H04N 13/0438* (2013.01); *H04N 13/0497* (2013.01); *H04N 2213/008* (2013.01)

(58) Field of Classification Search
CPC .......... H04N 13/0048; H04N 13/0438; H04N 13/0456; H04N 13/0497; H04N 2213/008
See application file for complete search history.

(56) References Cited

U.S. PATENT DOCUMENTS

| 5,943,166 A | 8/1999 | Hoshi et al. |
| 6,137,456 A | 10/2000 | Bhagavatula et al. |

(Continued)

FOREIGN PATENT DOCUMENTS

| EP | 2175304 A1 | 4/2010 |
| KR | 10-2011-0109647 A | 10/2011 |

(Continued)

OTHER PUBLICATIONS

Scher et al.; "3D+2DTV: 3D Displays with No Ghosting for Viewers Without Glasses"; ACM Transactions on Graphics; vol. 32 No. 3; Jun. 2013; p. 21:1-21:10.

(Continued)

*Primary Examiner* — Jessica M Prince
(74) *Attorney, Agent, or Firm* — Baker & Hostetler LLP

(57) ABSTRACT

Our inventive method enables stereoscopic 3D displays to be watched by 3D and 2D viewers simultaneously. Ghosted images observed on traditional 3D displays can be eliminated for viewers without stereoscopic glasses while 3D perception is preserved for viewers with glasses. A preferred method for displaying an image on a 3D+2D television comprises displaying a composite image ("L+wN"), comprising a left ("L") image and a weighted image ("wN"), for a first period of time; and displaying a right ("R") image for a second period of time. The display of "wN" partially cancels out the perception of "R" to mitigate ghosting for viewers not wearing 3D eyeglasses. In the illustrative embodiment, "wN" is a weighted negative version of "R".

12 Claims, 4 Drawing Sheets

(56) References Cited

U.S. PATENT DOCUMENTS

| | | | |
|---|---|---|---|
| 6,392,644 B1 | 5/2002 | Miyata et al. | |
| 6,687,003 B1 | 2/2004 | Sorensen et al. | |
| 2003/0128205 A1 | 7/2003 | Varghese | |
| 2007/0008406 A1 | 1/2007 | Shestak et al. | |
| 2008/0278640 A1 | 11/2008 | Ijzerman et al. | |
| 2009/0040402 A1* | 2/2009 | Tomita | H04N 13/0434 349/15 |
| 2010/0073467 A1 | 3/2010 | Nam et al. | |
| 2011/0090324 A1* | 4/2011 | Mentz | H04N 13/0438 348/55 |
| 2011/0102426 A1 | 5/2011 | Moon et al. | |
| 2011/0157257 A1 | 6/2011 | Bennett et al. | |
| 2011/0216252 A1 | 9/2011 | MacNaughton et al. | |
| 2011/0254836 A1 | 10/2011 | Kim et al. | |
| 2012/0069015 A1 | 3/2012 | Han et al. | |
| 2012/0113168 A1 | 5/2012 | Seo et al. | |
| 2012/0242797 A1* | 9/2012 | Watanabe | H04N 13/0438 348/46 |
| 2013/0076874 A1* | 3/2013 | Mentz | H04N 13/0434 348/51 |
| 2015/0062315 A1* | 3/2015 | Davis | H04N 13/0429 348/56 |

FOREIGN PATENT DOCUMENTS

| | | |
|---|---|---|
| RU | 200914028 A | 6/2011 |
| WO | WO 2009/045986 A1 | 4/2009 |
| WO | WO 2010/107174 A2 | 9/2010 |
| WO | WO 2011/031326 A2 | 3/2011 |
| WO | WO 2013/158322 A1 | 10/2013 |

OTHER PUBLICATIONS

Wu et al.; "Backward Compatible Stereoscopic Displays via Temporal Psychovisual Modulation"; SIGGRAPH Asia 2012; Nov.-Dec. 2012; 4 pages.
International Patent Application No. PCT/US2014/43911; Int'l Search Report and the Written Opinion; dated Apr. 7, 2015; 11 pages.
International Patent Application No. PCT/US2013/032821; Int'l Search Report and the Written Opinion; dated Jul. 11, 2013; 6 pages.
Agrawala et al.; "The Two-User Responsive Workbench: Support for Collaboration Through Individual Views of a Shared Space"; SIGGRAPH; 1997; Annual Conference Series; 6 pages.
Brown et al.; "Camera-Based Calibration Techniques for Seamless Multi-Projector Displays"; IEEE Trans. on Visualization and Computer Graphics; 2005; 16 pages.
Didyk et al.; "A Perceptual Model for Disparity"; ACM Transactions on Graphics 30; 2011; 9 pages.
Didyk et al.; "Apparent Stereo: The Cornsweet Illusion Can Enhance Perceived Depth"; In Human Vision and Electronic Imaging XVII; 2012; 12 pages.
Gateau et al.; Stereoscopy From XY to Z; Short Course SIGGRAPH Asia; 2010; 101 pages.
Grossberg et al.; "Making One Object Look Like Another: Controlling Appearance Using a Projector-Camera System"; IEEE Conf. on Computer Vision and Pattern Recognition; 2004; 8 pages.
Grundhofer et al.; "Real-Time Adaptive Radiometric Compensation"; IEEE Transactions on Visualization and Computer Graphics 14; 2008; 11 pages.
Jorke et al.; "Stereo Projection Using Interference Filters"; In Society of Photo-Optical Instrumentation Engineers (SPIE) Conf. Series; 2006; 8 pages.
Matusik et al.; 3D TV: A Scalable System for Real-Time Acquisition, Transmission, and Autostereoscopic Display of Dynamic Scenes; ACM Transactions on Graphics 23; 2004; 11 pages.
McDowall et al.; "Single and Multiple Viewer Stereo with DLP Projectors"; Proc. SPIE; 2001; 8 pages.
Morgan et al.; "Apparent Motion and the Pulfrich Effect"; Perception vol. 4; 1975; p. 3-18.
Perlin et al.; "An Autostereoscopic Display"; Proceedings of the 27th Annual Conf. on Computer Graphics and Interactive Techniques; 2000; 8 pages.
Vetro et al.; "Overview of the Stereo and Multiview Video Coding Extensions of the H.264/MPEG-4 AVC Standard"; Proceedings of the IEEE vol. 99 No. 4; Apr. 2011; p. 626-642.
Dogson; "Autostereoscopic 3D Displays"; IEEE Computer Society; Aug. 2005; p. 31-36.
Kim et al.; "A new liquid crystal display-based polarized stereoscopic projection method with improved light efficiency"; Optics Communications 249; 2005; p. 51-63.
U.S. Appl. No. 61/635,075; Provisional Specification; dated Apr. 8, 2012; 9 pages.
Dvorak V.; 1872; Uber analoga de personlichen differenz zwis-chen beiden augen und den netzhautstellen desselben auges.; Prag: Sitzber. d. k. bhm Gesellsch d. Wiss, 6574; 10 pages.
Pulfrich C.; 1922; Die stereoskopie im dienste der isochromen und heterochromen photometrie; Die Naturwissenschaften; 53 pages.

* cited by examiner

PRACTICAL TWO-FRAME 3D+2D TV

CROSS REFERENCE TO RELATED APPLICATIONS

This application is a National Stage Application file under 35 U.S.C. 371 of International Application No. PCT/US2014/043911, filed Jun. 24, 2014, which claims the benefit under 35 U.S.C. 119(e) of U.S. Provisional Patent Application No. 61/838,519, filed Jun. 24, 2013, the contents of which are hereby incorporated by reference in their entirety.

BACKGROUND

The present invention relates generally to three-dimensional television (3DTV) technology. More specifically, the invention relates to the subject matter of commonly owned application WO 2013/158322, filed Mar. 18, 2013, entitled "SIMULTANEOUS 2D AND 3D IMAGES ON A DISPLAY," which claims the benefit of U.S. Provisional Application No. 61/635,075, filed on Apr. 18, 2012. Both of these prior applications are hereby incorporated by reference in their entirety.

With a 3DTV, depth perception is conveyed to the viewer by employing techniques such as stereoscopic display, multi-view display, 2D-plus-depth, or some other form of 3D display. Most modern 3D television sets use an active shutter 3D system or a polarized 3D system and some are auto-stereoscopic without the need of glasses.

There are several techniques to produce and display 3D moving pictures. A basic requirement for display technologies is to display offset images that are filtered separately to the left and right eye. Two approaches have been used to accomplish this: (1) have the viewer wear 3D eyeglasses to filter the separately offset images to each eye, or (2) have the light source split the images directionally into the viewer's eyes, with no 3D glasses required.

SUMMARY

Most commercially available 3D displays show stereoscopic images to viewers wearing special glasses, while showing incomprehensible ghosted images to viewers without glasses. It is not always desirable to require that all viewers wear stereo glasses. They may cause flickering, interfere with other activities or be prohibitively expensive. Our inventive method enables stereoscopic 3D displays to be watched by 3D and 2D viewers simultaneously. Ghosted images observed on traditional 3D displays can be significantly reduced for viewers without stereoscopic glasses while 3D perception is preserved for viewers with glasses.

In a presently preferred implementation of the invention, a method for displaying an image on a 3D+2D television comprises displaying a composite image ("L+wN"), comprising a left ("L") image and a weighted image ("wN"), for a first period of time; and displaying a right ("R") image for a second period of time, wherein the display of "wN" partially cancels out the perception of "R" to mitigate ghosting for viewers not wearing 3D eyeglasses. In the illustrative embodiment, "wN" is a weighted negative version of "R".

Other features and advantages of the present invention are described below.

DETAILED DESCRIPTION OF ILLUSTRATIVE EMBODIMENTS

In the following sections, we will first review the inventive methods disclosed by the applicant's prior disclosure in WO 2013/158322 (cited above), and then we will describe practical enhancements of the inventive subject matter using two frames.

A. 3D+2D DISPLAYS WITHOUT GHOSTING

In WO 2013/158322, the inventors disclosed a method that provides viewers with eyeglasses a 3D experience while viewers without glasses see a 2D image without artifacts. In addition to separate Left and Right images in each frame, the inventive method adds a third image, which is invisible to those with glasses. In the combined view seen by those without glasses, this third image cancels the Right image, leaving only the Left. If the Left and Right images are of equal brightness, this approach results in low contrast to viewers without glasses. Allowing differential brightness between the Left and Right images improves 2D contrast. The inventors determined that viewers with glasses maintain a strong 3D experience, even when one eye is significantly darker than the other. Since viewers with glasses see a darker image in one eye, they experience a small distortion of perceived depths due to the Pulfrich Effect. This produces illusions similar to those caused by a time delay in one eye. The inventors disclosed that a 40% brightness difference cancels an opposing distortion caused by the typical 8 millisecond delay between the Left and Right images of sequential active-shutter stereoscopic displays. In sum, the disclosure in WO 2013/158322 focuses on methods involving the implementation of a third channel, as well as the brightness of the composite 2D image, 2D viewer preferences, 3D viewer depth perception, and moving 3D objects and the Pulfrich effect.

Figure 1:
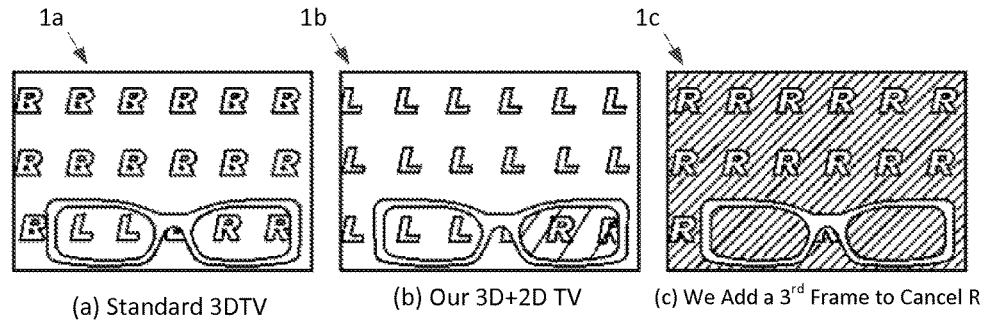
FIG. 1, part (a), depicts how a typical glasses-based 3DTV shows a different image to each eye of viewers wearing stereo glasses. Part (b) depicts how an inventive 3D+2DTV shows a different image to each eye of viewers wearing stereo glasses, but shows only one of these images to those without glasses, removing the "ghosted" double-image. Part (c) illustrates that this is accomplished by cancelling out one image of the stereo pair.

FIG. 1 depicts images 1a, 1b, and 1c, which may be summarized as follows: (a) A typical glasses-based 3DTV shows a different image to each eye of viewers wearing stereo glasses, visible through the glasses at the bottom of the figure, while those without glasses see both images superimposed, visible directly on the screen at the top of the figure. (b) The 3D+2DTV likewise shows a different image to each eye of viewers wearing stereo glasses, but shows only one of these images to those without glasses, removing the "ghosted" double-image. (c) This result is accomplished by displaying a 3rd image to those not wearing glasses that is not visible to those wearing glasses, cancelling out one image of the stereo pair.

Figure 2:
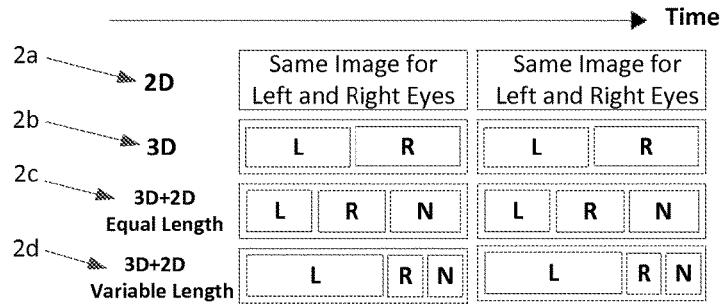
FIG. 2 depicts a comparison of various displays that show a sequence of frames.

FIG. 2 illustrates a comparison of displays that show a sequence of frames. Reference numerals 2a, 2b, 2c and 2d represent the first, second, third and fourth rows, respectively, which depict the following: (1st row) A traditional 2D display shows a single image to both eyes. (2nd row) Each frame in a traditional active shutter glasses 3D display includes a distinct image for the Left (L) and Right (R) eyes of a viewer with glasses, while a viewer without glasses sees both images overlaid, with both eyes. (3rd & 4th rows) The 3D+2D display adds a third image (N) to each frame, shown to neither eye of the viewer with glasses, but seen by both eyes of a viewer without glasses. This third image is used to display the negative of the Right image, leaving them a low-contrast version of the Left image. A 3D+2D display may display each image for an equal length of time or allot more time to the left image to improve contrast, shortening the R and N images accordingly.

The most popular 3D display paradigm shows a pair of images on the same screen, intended for the viewers' left and right eyes. The lenses of special shuttered or polarized "stereo glasses" pass images to the correct eye. A viewer not wearing these glasses sees both images superimposed, creating a "ghosted" double-image where two copies of objects appear overlaid (see FIG. 1a). It is not always desirable to require that all viewers wear stereo glasses. They can be prohibitively expensive, or may interfere with other activities. It would be preferable to allow those not wearing stereo glasses to see a single, un-ghosted view of the screen (see FIG. 1b).

Simultaneous viewing of 3D and 2D images may be accomplished by replacing the pair of images (Left, Right) with a triplet (Left, Right, Neither), where those wearing stereo glasses see the Neither image with neither eye; only those without stereo glasses can see it. The Neither image is the negative of the Right image (see FIG. 1c) so that they cancel when superimposed, leaving only the Left. Unfortunately, this raises the minimum black level of the display for viewers without stereo glasses, drastically decreasing the contrast ratio. This can be mitigated by reducing the brightness of the Right image, αR, to αR<100%, while maintaining the Left image at full brightness. If this adjustment is small, the effect on the 3D experience of viewers with stereo glasses is negligible, but the increase in contrast ratio for viewers without glasses is also modest. If this reduction is larger, the improved contrast ratio for viewers without glasses will be significant, but if too large, the 3D experience of viewers with glasses will deteriorate. Experimentation indicated that an acceptable range of αR for both viewers with and without glasses was 20%≤αR 69≤60%.

The left and right images may be given unequal brightness either by directly dimming one of the two images, or by adjusting the time allotted to each image, using variable-length frames. When viewers wearing stereo glasses see a brighter image with one eye than the other, they soon become accustomed to this and report an acceptable 3D experience. However, they also report that horizontally-moving objects appear at different depths than stationary or vertically-moving objects with the same disparity. This small, but measurable, phenomenon is known as the "Pulfrich Effect" and is similar to a time-delay of several milliseconds in their perception of the darker image. The inventors conducted experiments to quantify this effect, and also measured a similar depth-distortion caused by the 8 millisecond delay between the Left and Right images in a 120 Hz display. The inventors showed that these two effects cancel each other when one eye's brightness is 40% that of the other eye. In this regard depth perception is not diminished when one eye is dimmed, but instead is slightly improved.

Figure 3:
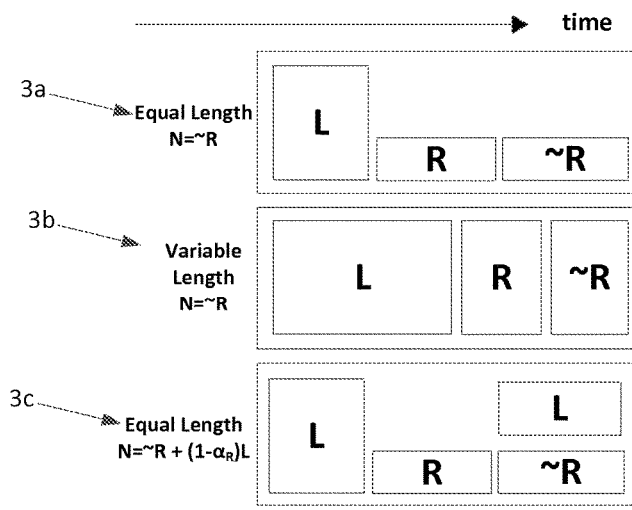
FIG. 3 illustrates how different amounts of wasted light result from different frame lengths for the L, R and inverse R frames.

FIG. 3 illustrates how different amounts of wasted light result from different frame lengths for the L, R and inverse R frames. Reference numerals 3a, 3b and 3c represent the top, middle and bottom rows, respectively, which depict the following: (Top Row) When all three frames have Equal Length and N=~R, some available light is wasted. (Middle Row) Variable-Length Frames waste no light, improving contrast for 2D viewers. (Bottom Row) When using Equal-Length frames, the brightness for 2D viewers may be improved by setting N=~R+(1−αR)·L, wasting less light. For brevity we refer the inverse of R as: ~R=(αR·maxL−R).

Figure 4:
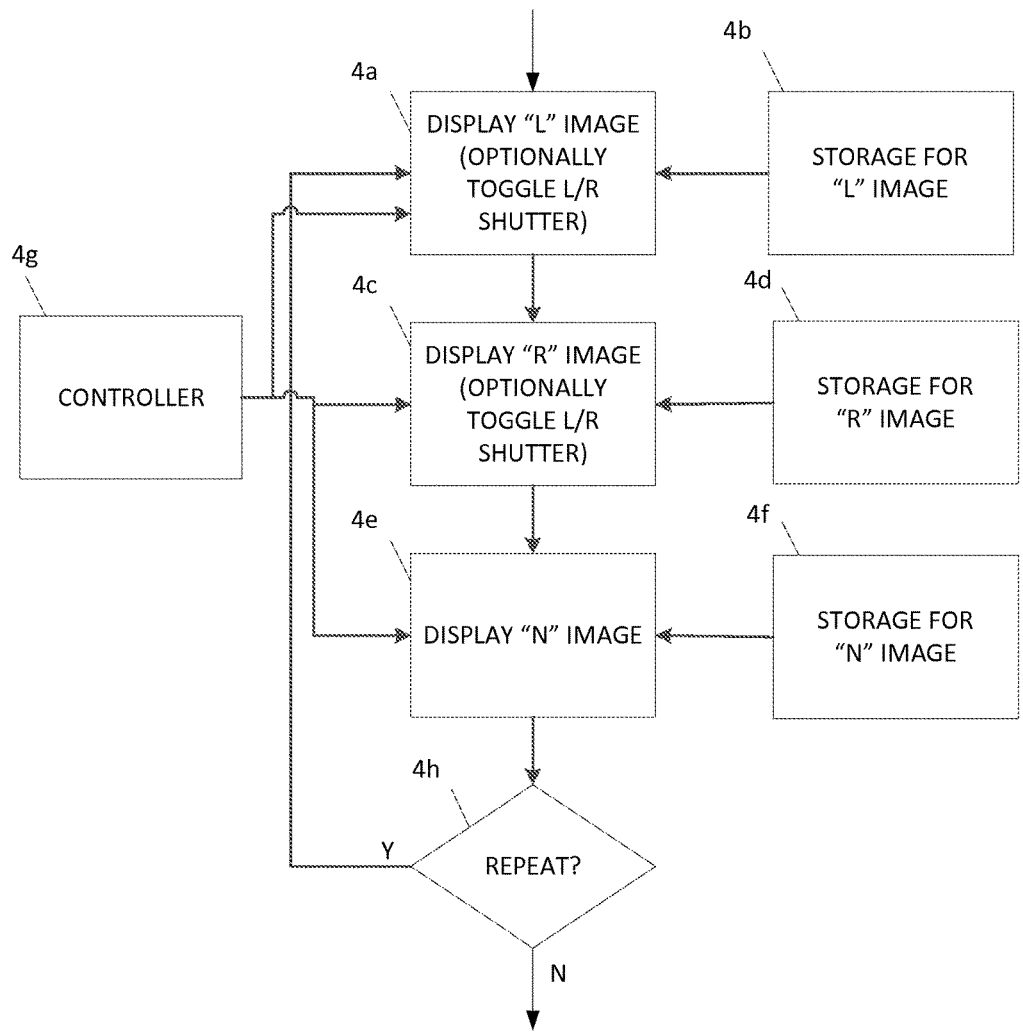
FIG. 4 is a block diagram of a system in accordance with the embodiment of FIG. 15 of prior application WO 2013/158322, filed Mar. 18, 2013, "SIMULTANEOUS 2D AND 3D IMAGES ON A DISPLAY".

Turning now to FIG. 4, the inventive embodiments described in WO 2013/158322 may be summarized as follows. A left ("L") image or sub-image is displayed in a first period of time. This is shown in block 4a. The "L" image is obtained from storage 4b. The display of the "L" image may optionally be coordinated with the toggling of a shutter, e.g., in the right lens of 3D eyeglasses being worn by a viewer. In other words, if a viewer is wearing shutter eyeglasses, these may be controlled to prevent the "L" image from being viewed in the right eye of the viewer. Next, a right ("R") image is displayed for a second period of time, as represented by block 4c. As shown, the "R" image is obtained from storage 4d. As with the "L" image, the display of the "R" image may be coordinated with the toggling of a shutter covering the left eye of the viewer. The display of the "R" image is followed by the display of the "N" image, for a selected period of time, as shown in block 4e. The "N" image is obtained from storage 4f. As discussed above, this step is designed to substantially cancel out the perception of the "R" image for viewers not wearing 3D eyeglasses, to mitigate ghosting for viewers not wearing 3D eyeglasses. If additional images are to be displayed, as indicated in decision block 4h, the process is repeated. These steps are controlled by a controller 4g, which may be a programmed microprocessor or the like.

This method will likely be more readily adopted by active shutter displays, i.e., since it can be implemented by manufacturers at low cost, allows consumers to avoid purchasing additional pairs of active-shutter glasses, and removes a minor but undesirable depth distortion present in active-shutter displays. Moreover, the method employs three channels ("L", "R", "N"), which could be provided by a single method, such as augmenting a pair of spectral comb filters with a third set of narrow bands, or by combining methods, such as using polarization and spectral comb filters together to produce four orthogonal channels. Finally, the frame lengths for the "L", "R" and inverse R frames may be adjusted to optimize the viewers' experience.

The present invention builds upon the prior invention described in WO 2013/158322 but adds some practical improvements, one of which is a practical two-frame 3D+2D display. As discussed below, the three frame method is ideal but cannot be implemented without hardware modification, which may be undesirable. We have therefor provided a method, for use with standard 2-frame displays, in which the [Neither] image is simply added to the [Left] image slot. (See description below with reference to FIG. 6.)

Our method enables stereoscopic 3D displays to be watched by 3D and 2D viewers simultaneously. Ghosted images that are observed on traditional 3D displays can be eliminated for viewers without stereoscopic glasses while 3D perception is preserved for viewers with glasses. We accomplish simultaneous viewing of 3D and 2D images by replacing the pair of images [Left, Right] with a triplet [Left, Right, Neither]. Those wearing glasses see the Neither image with neither eye; only those without stereo glasses can see it. The Neither image is the negative of the Right image so that they sum to a grey image when superimposed, leaving only the Left image visible to 2D viewers. Unfortunately, this raises the minimum black level of the display for viewers without stereo glasses, decreasing the contrast ratio. This can be mitigated by reducing the brightness level of the Right image, $\alpha_R$, while maintaining the Left image at full brightness. Reducing $\alpha_R$ improves the contrast ratio for 2D viewers. However if $\alpha_R$ is decreased too much, the 3D experience of viewers with glasses will deteriorate. We conducted experiments, on both viewers with and without glasses, identifying the acceptable range of $\alpha_R$ to be $20\% \leq \alpha_R \leq 60\%$. Further details validating the design for both 3D and 2D viewers can be found in Scher, S., Liu, J., Vaish, R., Gunawardane, P., and Davis, J. 2013. "3D+2D TV: 3D Displays With No Ghosting for Viewers Without Glasses," *ACM Trans. On Graphics*, (@SIGGRAPH13).

B. PRACTICAL ENHANCEMENTS

1. Ghosting-Control Weight

Although viewers prefer contrast loss to a fully ghosted image, the contrast loss is also undesirable. Thus we investigated the optimal trade-off between contrast loss and ghosting for 2D viewers.

The image that 2D viewers see can be represented as:

[Left]+$\alpha_R$*[Right]+$w$*[Neither]

When w equals $\alpha_R$, no ghosting is visible. Decreasing w improves the contrast ratio, at the cost of some visible ghosting. Varying w will not affect 3D viewers, but provides the benefits of searching in a larger space for a satisfying 2D image. Initial studies were conducted by letting users modify w interactively. When $\alpha_R$=40% our test subjects preferred w=60%, an intermediate level of both ghosting and contrast.

2. Two Frame Approximation

Figure 5B:
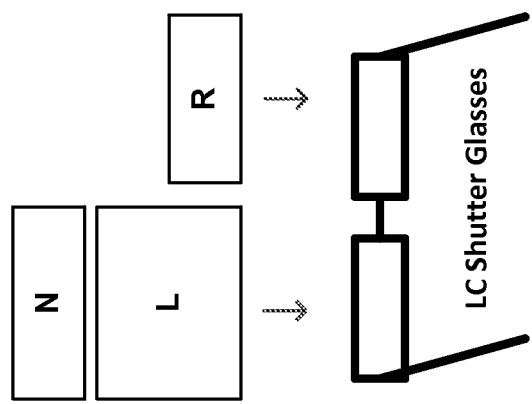
FIG. 5B illustrates how a two frame approximation can be achieved by adding the [Neither] image to the [Left] image.
Figure 5A:
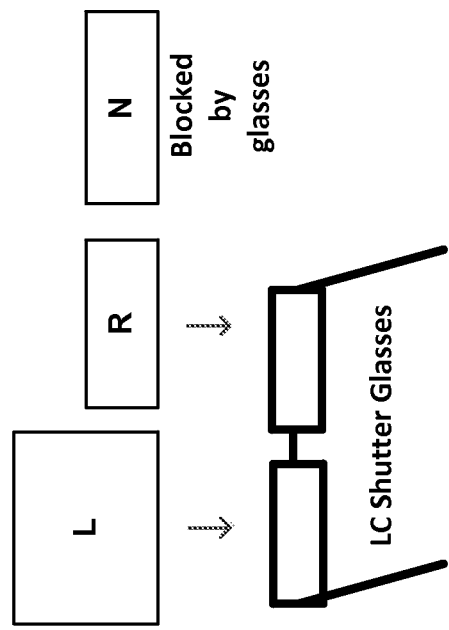
FIG. 5A illustrates the three frame method in which a third channel is inserted to display the [Neither] image.

The three frame method is ideal, but cannot be implemented without hardware modification. FIGS. 5A and 5B show an approximation for standard 2-frame displays. The [Neither] image is simply added to the [Left] image slot. This introduces negative crosstalk into the [Left] image. However, our display, like many existing stereo displays, has noticeable positive crosstalk due to hardware limitations. Since the negative and positive crosstalk cancel, this results in total crosstalk to the left eye only a little greater than the standard level. Test users have found the 3D image quality acceptable.

Figure 6:
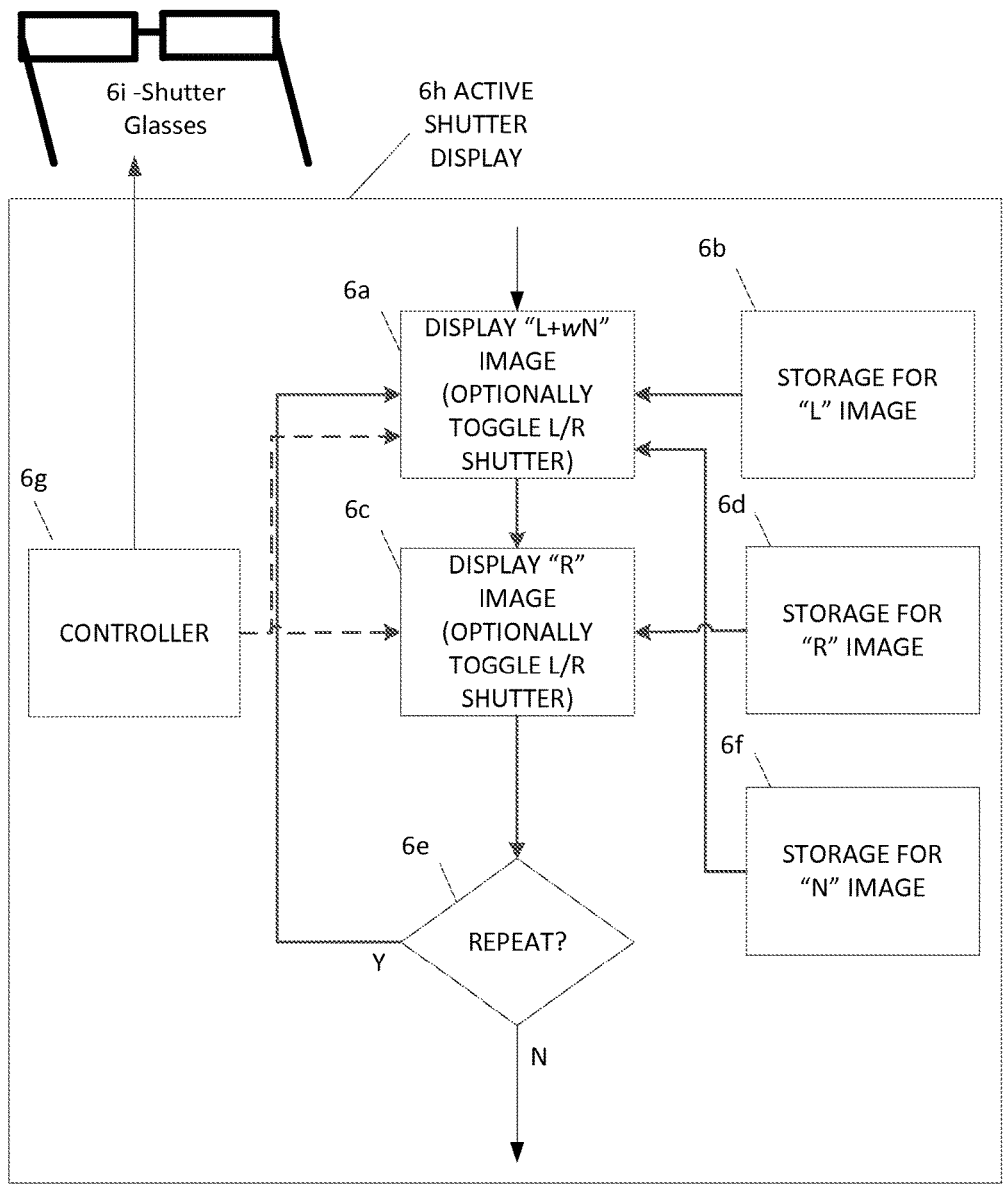
FIG. 6 is a block diagram of a system in accordance with the present invention, i.e., a two-frame embodiment of the system of FIG. 4.

Turning now to FIG. 6, the inventive two-frame system may be summarized as follows. A left ("L") image or sub-image is displayed for a first period of time, and the weighted neither ("N") image is displayed during the same first period. In other words, the "wN" image is added to the "L" image, and the "L+wN" image is displayed during the first time interval. The "N" image in this case is weighted as discussed above. This is shown in block 6a. The "L" image is obtained from storage 6b and the "N" image is obtained from storage 6f. The display of the "L+N" image may optionally be coordinated with the toggling of a shutter, e.g., in the right lens of 3D eyeglasses being worn by a viewer. In other words, if a viewer is wearing shutter eyeglasses, these may be controlled to prevent the "L+N" image from being viewed in the right eye of the viewer. Next, a right ("R") image is displayed for a second period of time, as represented by block 6c. As shown, the "R" image is obtained from storage 6d. As with the "L" image, the display of the "R" image may be coordinated with the toggling of a shutter covering the left eye of the viewer. As discussed above, this step is designed to substantially cancel out the perception of the "R" image for viewers not wearing 3D eyeglasses, to mitigate ghosting for viewers not wearing 3D eyeglasses. If additional images are to be displayed, as indicated in decision block 6e, the process is repeated. These steps are controlled by a controller 6g, which may be a programmed microprocessor or the like. Finally, the inventive method is preferably performed with or by an active shutter display device 6h and optional shutter glasses 6i.

C. CONCLUSION 3D display technology is quickly growing in popularity. Many current displays require that viewers wishing to see the 3D scene wear special glasses; viewers without glasses not only do not see a 3D scene, but see an unappealing double-image. We have demonstrated a method to produce 3D displays where viewers wearing glasses see a 3D scene, while those without glasses see a satisfactory 2D scene.

The true scope of the present invention is not limited to the presently preferred embodiments disclosed herein. For example, the foregoing disclosure of methods and systems for use in making a 3D+2DTV system uses explanatory terms, such as 3DTV, 2DTV, and the like, which should not be construed so as to limit the scope of protection of the following claims, or to otherwise imply that the inventive aspects of the disclosed system are limited to the particular methods and apparatus disclosed. Accordingly, except as they may be expressly so limited, the scope of protection of the following claims is not intended to be limited to the specific embodiments described above.

What is claimed:

1. A method for displaying an image on a 3D+2D television, comprising:
    displaying (6a) a composite image ("L+wN"), comprising a left ("L") image and a weighted image ("wN"), for a first period of time; and
    displaying (6c) a right ("R") image for a second period of time; and
    wherein the display of "wN" partially cancels out the perception of "R" to mitigate ghosting for viewers not wearing 3D eyeglasses, wherein "wN" is a weighted negative version of "R"; and
    wherein a reduction in contrast ratio for viewers without stereo glasses is mitigated by reducing the brightness level of the right image while maintaining the left image at full brightness, wherein the brightness level of the right image is reduced to a range of 20% to 60% of full brightness.

2. A method as recited in claim 1, wherein additional images are displayed by repeating (6e) the steps of claim 1.

3. A method as recited in claim 1, wherein the steps are controlled by a controller (6g).

4. A method as recited in claim 1, wherein the method is performed using an active shutter display device (6h).

5. A method as recited in claim 1, wherein the frame lengths for the display of "L+wN" and "R" are adjusted to optimize a viewer's experience.

6. A method as recited in claim 1, wherein the images "L" and "R" are obtained from storage (6b, 6d).

7. A method as recited in claim 1, wherein the display of "L+wN" is coordinated with the toggling of a shutter in the right lens of 3D eyeglasses being worn by a viewer, and the display of "R" is coordinated with the toggling of a shutter covering the left eye of the viewer.

8. A method as recited in claim 1, wherein "N" is obtained from storage (6f).

9. A 3D+2D television system, comprising:
- an active shutter display device (6h) configured for viewing by one or more viewers;
- a pair of 3D eyeglasses (6i) that can optionally be worn by a viewer;
- means (6a) for displaying a composite image ("L+wN"), comprising a left ("L") image and a weighted image ("wN"), for a first period of time; and
- means (6c) for displaying a right ("R") image for a second period of time;
- wherein the display of "wN" partially cancels out the perception of "R" to mitigate ghosting for viewers not wearing 3D eyeglasses, wherein "wN" is a weighted negative version of "R";
- wherein a reduction in contrast ratio for viewers without stereo glasses is mitigated by reducing the brightness level of the right image while maintaining the left image at full brightness, wherein the brightness level of the right image is reduced to a range of 20% to 60% of full brightness.

10. A 3D+2D television system as recited in claim 9, further comprising a controller (6g) for controlling the display of "L+wN" and "R", and storage (6b, 6d) for storing "L" and "R".

11. A 3D+2D television system as recited in claim 9, wherein the 3D eyeglasses (6i) include an active shutter.

12. A 3D+2D television system as recited in claim 9, wherein frame lengths for "L+wN" and "R" are adjustable to optimize a viewer's experience.

* * * * *